United States Patent [19]
Clark

[11] 3,743,320
[45] July 3, 1973

[54] VEHICULAR STEPS
[75] Inventor: Arthur C. Clark, San Jose, Calif.
[73] Assignee: Holiday Vehicle Specialties, Inc., Mountain View, Calif.
[22] Filed: Aug. 5, 1971
[21] Appl. No.: 169,236

[52] U.S. Cl. .............................. 280/166, 182/91
[51] Int. Cl. .......................................... B60r 3/02
[58] Field of Search ..................... 280/166; 296/62; 182/88, 91, 89, 99

[56] References Cited
UNITED STATES PATENTS
| | | | |
|---|---|---|---|
| 2,029,745 | 2/1936 | Stiner | 182/88 |
| 2,971,600 | 2/1961 | Schultz | 182/88 |
| 2,956,638 | 10/1960 | Bustin | 182/88 |
| 3,645,557 | 2/1972 | Aldropp et al. | 280/166 |
| 3,515,406 | 6/1970 | Endsley, Jr. | 280/166 |

Primary Examiner—Kenneth H. Betts
Assistant Examiner—D. M. Mitchell
Attorney—Paul F. Morgan

[57] ABSTRACT

Retractable steps are provided for an entrance-way to a trailer or mobile home or the like. A step unit is readily movable from any desired stowed position beneath the vehicle to a deployed position in which it provides steps extending both above and below the stowed position. The upper step may be positioned directly adjacent the entrance-way. A simple pivotable mechanism with a simple slot stamped from the sides of the step unit provides easy manual rotation of the steps from a horizontal stowed position into the upright operating position, and then automatically locks them in position. The mechanism employed is simple and easy to manufacture and allows the step height to be readily varied in manufacturing to accommodate varying vehicles.

5 Claims, 7 Drawing Figures

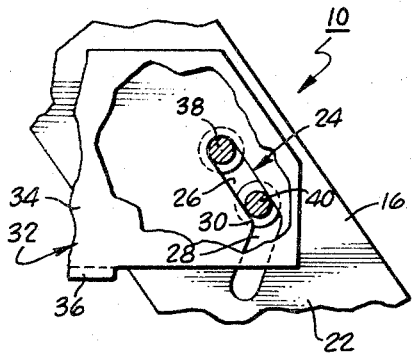
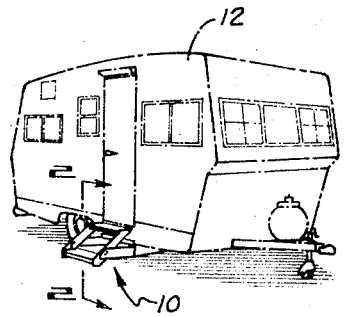
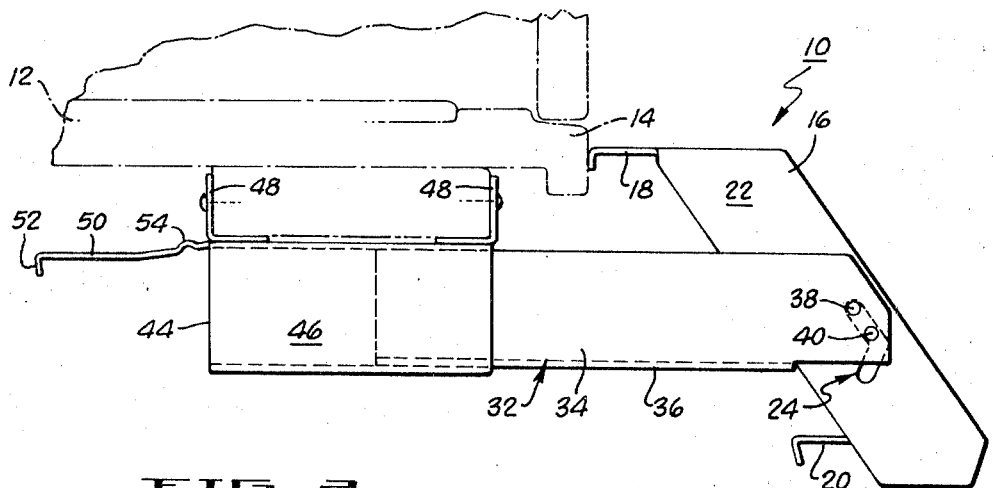
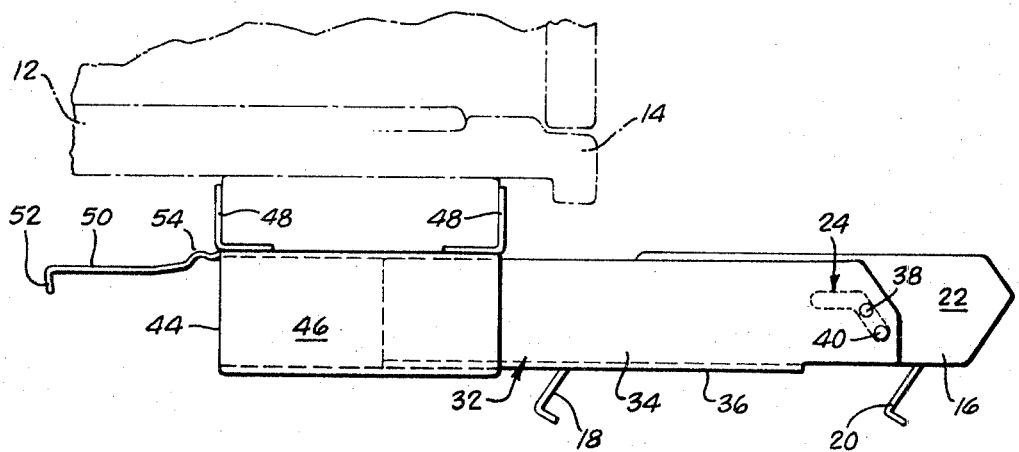

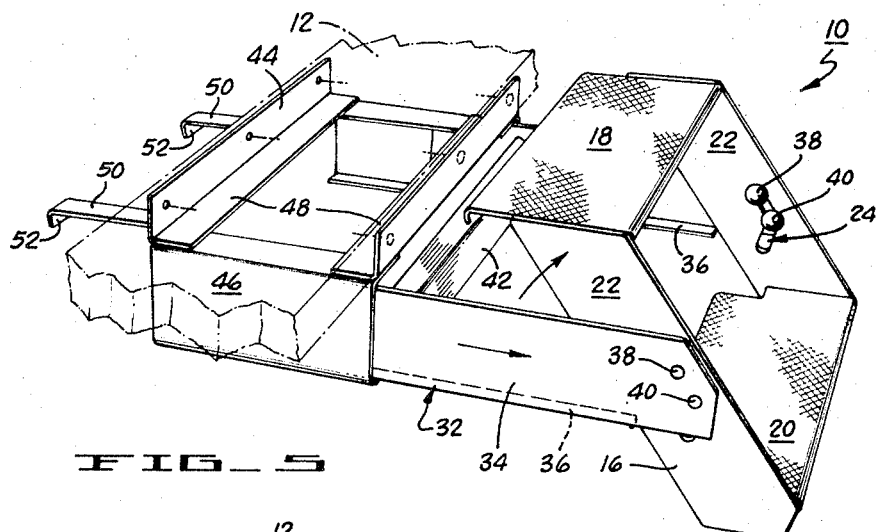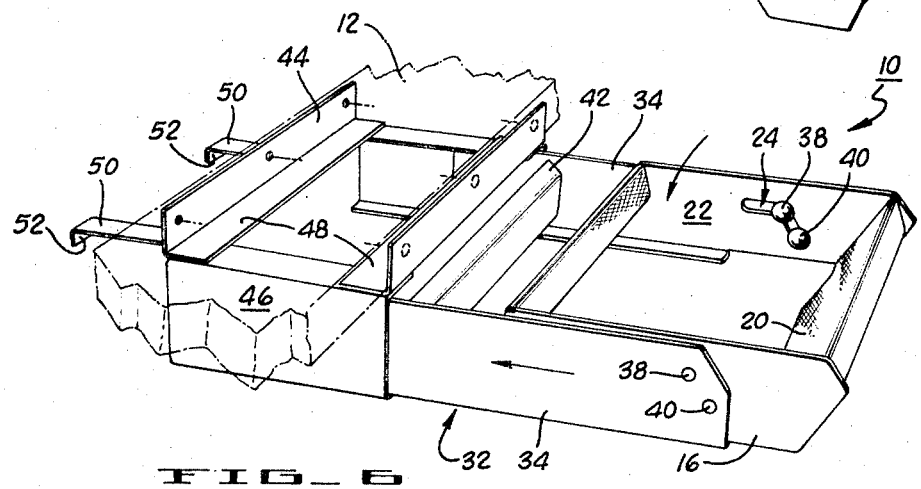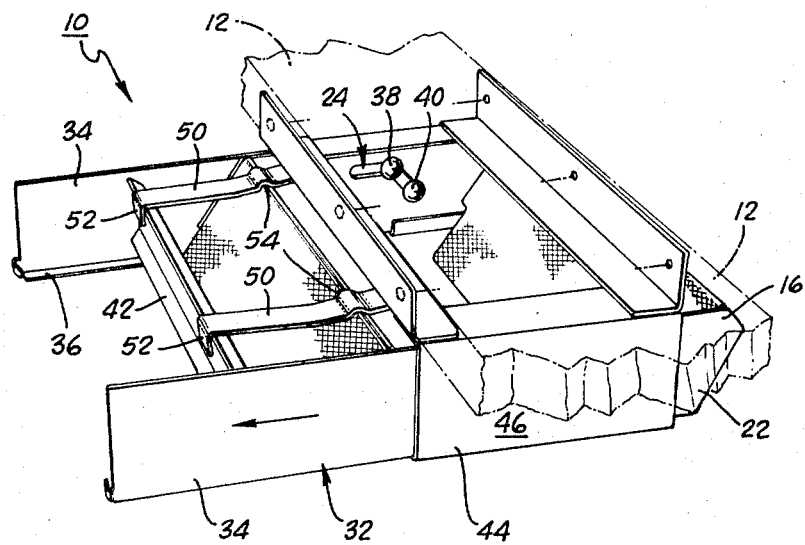

VEHICULAR STEPS

The invention relates to vehicular mounted steps, and more particularly to apparatus providing a plurality of retractable steps with improved vehicular access and manufacture.

It will be appreciated that numerous retractable vehicular steps are well known in the art. The present invention provides steps which may be conveniently mounted at a desired location under a vehicle, and are fully retractable thereunder for travel, yet may be easily extended and then pivoted by the operator from the stowed position to form fixed steps conveniently leading all the way up from the ground to the desired egress location on the vehicle. The steps do not have to be located at or below their storage area or the mounting position on the vehicle. The steps may be positioned where needed for the vehicle. The uppermost step may be extended substantially above the mounting or retracted position of the steps. In most retractable structures this would give rise to an inherent dangerous instability which could cause the steps to involuntarily pivot when weight is applied to the steps under certain conditions. The present invention overcomes this and other problems by a mechanism which allows the steps to be readily extended and pivoted into an upright extended position yet automatically locks the steps against inadvertent rotation once they are in their operating position. Weight applied to the steps simply increases the locking force. The pivotal interconnecting and locking mechanism is simple to manufacture and lends itself to simple adjustments of the selected step heights during the manufacturing operation so as to readily accommodate various vehicles. Improved stowage means are also provided.

Further objects, features, and advantages of the invention pertain to the particular arrangements and structures whereby the above mentioned and other aspects of the invention are attained. The invention will be better understood by reference to the following description and to the drawings forming a part thereof, wherein:

FIG. 1 is a perspective view of exemplary folding vehicular steps in accordance with the present invention, shown in their extended operating position on an exemplary vehicle;

FIG. 2 is a side view of the folding steps embodiment of FIG. 1;

FIG. 3 is the same side view as FIG. 2 except that the extended step unit is pivoted down into a horizontal position preparatory to stowage;

FIG. 4 is a detailed and partially broken away side view of the pivotal interconnection and locking mechanism illustrated in FIGS. 2 and 3;

FIG. 5 is a perspective view of the folding steps of FIGS. 1-4 in their fully extended operating position;

FIG. 6 is a perspective view of the folding steps of FIGS. 1-5 in the folded position of FIG. 3; and FIG. 7 is a perspective view of the folding steps of FIGS. 1-6 in in their fully stowed position.

Referring to the drawings, FIGS. 1-7, there is shown therein exemplary folding steps 10 in accordance with the present invention. The folding steps 10 here basically comprise a tilting step unit 16 which integrally pivotally mounts to a slideout frame 32 providing an extension means which horizontally retracts with the step unit 16 within a mounting frame 44 for stowage. The mounting frame 44 mounts and stows the complete folding steps 10 at a convenient location under the vehicle 12. The folding steps 10 are illustrated in FIG. 1 as providing a pair of steps directly and evenly spaced from the doorsill 14 of a trailer 12 to the ground. It will be appreciated that both the type of vehicle and the number of steps may be varied without departing from the invention although two steps are generally sufficient. In fact, the folding steps 10 lend themselves particularly well to adaptation to various types of vehicles because they can readily adapt to wide varieties in the spacing between the height of the vehicle entrance and the height of their (lower) mounting position. The sizes of the parts of the steps 10 do not have to be changed, merely the location at which a slot is stamped in two parts. This allows the manufacture of the entire folding steps 10 from standardized sheet metal parts for various vehicles.

Considering the step unit 16, it may be seen that it comprises an upper step 18 and a lower step 20, each extending between opposite ends of a pair of parallel side members 22. These components are preferably metal plates welded together to provide a strong integral step unit 16. Preferably, as shown, the upper step 18 provides an uninterrupted plane surface of the step unit 16 when the step unit is tilted up into its operating position as shown in FIGS. 1, 2, and 5. Note that in this open position the steps 18 and 20 are horizontal and the side members 22 extend generally vertically downwardly away from the vehicle doorsill 14. In contrast, in the folded down position of FIGS. 3 and 6 and the stowed position of FIG. 7 the side members 22 are horizontal.

It may be seen that the step unit 16 is supported here solely by the horizontally extending slideout frame 32. The slideout frame 32 comprises a pair of horizontal extending slideout arms 34 spaced apart substantially the same distance as the pair of side members 22 of the step unit 16. The slideout arms 34 provide a pair of cantilever beams of sufficient width to support the step unit 16 and its loads. Further, as may be seen in FIG. 3, for example, the width (vertical height) of the slideout arms 34 is preferably equal to or greater than the width of side members 22 so that in the retraction of the folding step unit for stowage, the step unit 16 fits within the slideout frame 32.

The pivotal movement of the step unit 16 with respect to the slideout frame 32 is illustrated by the difference in position between FIGS. 2 and 3 or between FIGS. 5 and 6. This pivotal interconnection is provided by a simple yet effective pivoting and locking structure shown in these figures and illustrated in greater detail in FIG. 4. This structure is the same at each side, so only one side need be described herein. It may be seen that at an intermediate point on each side members 22 of the step unit 16 there is provided a generally boomerang shaped enclosed slot 24. The position of this slot 24 is shown here approximately midway between the upper step 18 and the lower step 20. However, since the slot 24 may be readily stamped or cut in different positions in the side members 22, the slot position may be readily changed in manufacturing to change the relative step heights. Also, the positions of the steps may be varied. Extending through and mateing with the slots 24 are a spaced pair of pins. They are an upper pin 38 and a lower pin 40 on each slideout arm 34 adjacent its outer end. It may be seen that the pins 38 and 40 are here provided by short roundheaded bolts welded to the slideout arms 34. Pal nuts or other retainers may also be used. The pins 38 and 40 have a shaft diameter substantially equal but slightly less than the width of slots 24. Their heads are wider than the slots 24 to retain the side members 22.

Referring particularly to FIG. 4, it may be seen that the slot 24 is of a substantially constant width equivalent to the shaft diameters of the pins 38 and 40. It is an elongate aperture in the side member 22 but of dimensions sufficiently smaller than the side member 22 as to not substantially affect its structural integrity. It has two straight sided arms or portions which angularly intersect. These are designated here as the upper portion 26 and the lower portion 28 of the slot 24. The upper portion 26 here extends generally vertically and in line with the side members 22 in the step unit's open or operating position. Since the pins 38 and 40 are correspondingly aligned, and since the length of the upper portion 26 is greater than the spacing between the pins 38 and 40 so as to simultaneously closely engage both pins, and since no curved camming surfaces are provided, it may be seen that the step unit 16 is firmly locked in this operating position. The straight and parallel sides of the upper portion 26 of the slot 24 do not provide any camming action with the pins 38 and 40 thus neither horizontal or downward forces on the step unit 16 will move it out of its open position. All downward vertical load forces applied to the step unit 16 press it down more firmly over the two pins. This is an important safety feature as it prevents inadvertant collapse or pivoting of the step regardless of the angle or position at which the operator steps on the steps. The upper end of the slot 24 is rounded closed to the same diameter as the shaft of the upper pin 38. Thus the vertical load imposed on the steps can be carried by the pin 38 abutting the upper end of the slot 24, without binding.

Considering now the operation of the above described pivotal interconnection between the step unit 16 and the slideout frame 32 as the step unit 16 pivots to the horizontal for storage it may be seen from FIGS. 3, 6, and 7 that when the step unit is lifted slightly, the pins 38 and 40 slide into the lower portion 28 of the slots 24. As noted in FIG. 4, this is preferably assisted by the rounding of the interior arcuate side surface 30 of the slot 24 at the angular intersection between the upper and lower portions 26 and 28 of the slot 24. The alignment of the lower portion 28 allows the step unit to fold down to a horizontal position.

The configuration of the lower portion 28 of the slot 24 is not as critical, as its function is to provide sufficient clearance and room for movement of the pins 38 and 40 to allow the step unit 16 to be rotated to a horizontal position for storage. It may be seen here that the lower portion 28 corresponds to the upper portion 26 except that it is at an angle with respect to the side members 22 such that when both of the pins 38 and 40 are located therein, the step unit 16 is horizontal and parallel to the slideout arms 34. Note that this downward pivotal movement of the step unit 16 requires the initial upward movement of the step unit 16 to unlock it, i.e., so that the pins slide out of the upper portion 26 of the slots 24. Only the lower pin 40 need be removed from the upper portion 26 of the slot 24. The upper pin 38 may remain therein if desired.

It may be seen from the above description that the above described arrangement of a simple pair of pins operating in a single simple slot at each side of the folding steps 10 provides a very simple yet effective pivotal interconnection for raising and lowering the steps and for securely retaining them in their raised position. Even more significantly, the steps 18 and 20 pivot both above and below, respectively, the slideout frame 32 and mounting frame 44 by which they are attached to the vehicle by a distance which is controlled by the point of pivotal interconnection, which point may be readily varied in manufacturing. No other or additional camming or locking mechanism is required. In operation the upper step 18 is at the level of the doorsill 14, which is highly desirable in many applications, yet in the stowed position, the entire folding step 10 is substantially below the doorsill 14.

Considering in greater detail the slideout frame 32, it may be seen that the slideout arms 34 are rigidly interconnected by a crossarm 42, clearly shown in FIGS. 6 and 7. The lower edges of the otherwise vertical slideout arms 34 have a small, inwardly projecting flange 36. This flange 36 provides a horizontal track for the slidable mounting of the slideout arms 34 within the mounting frame 44. The flanges 36 terminate short of the ends of the slideout arms 34 so as not to interfere with the rotation of the step unit 16. The flanges 36 also provide a stop for retaining the step unit 16 when it has been rotated down to its horizontal position as shown in FIG. 6. In that position the inside edges of the side members 22 abut the flanges 36.

The slideout frame 32 is freely slidable horizontally from the mounting frame 44 to provide extension and retraction of the step unit 16. In operation, the slideout frame 32 may be slid out away from the vehicle a sufficient distance to allow clearance for the rotation of the step unit 16 into its upright locked position. Then the slideout frame 32 and the step unit 16 can be slid back toward the vehicle until the inner edge of the upper step 18 abuts the doorsill 14 as shown in FIG. 2, if desired. Any desired degree of extension can be provided since the extension of the slideout frame 32 is an independent function independent of the rotation of the step unit 16.

The exemplary mounting frame 44 illustrated here may be varied substantially depending on the particular vehicle to which the folding steps 10 are to be mounted. The mounting frame 44 is shown here with a spaced pair of side channels 46 slidably enclosing the slideout arms 34 of the slideout frame 32. These slide channels 36 are in turn bolted or otherwise fastened to the bottom of the vehicle by overlying mounting brackets 48 extending therebetween.

A feature of the mounting frame 44 is the provision of simple yet dual function retainers 50. The two retainers 50 illustrated here are fastened to the mounting frame 44 and extend generally horizontally and rearwardly thereof. They are positioned in the path of the cross arm 42 of the slideout frame 32 as the slideout frame 32 is slid into the fully retracted (stowed) position. Preferably the retainers 50 are made from resilient steel straps. The outer ends of the retainers 50 are bent downwardly to form hooklike stop portions 52 to stop the rearward movement of the slideout frame 32. Simultaneously, an intermediate portion of the retainers 50, herein defined by arcuate detent portions 54, resiliently forcibly engages the upper step 18. The detent portion 54 provides a spring catch resisting outward movement of the slideout frame 32 once the detents are engaged. Simultaneously, the resilient engagement by the downward spring force of the retainers 50 on the step unit 16, and thereby on the slideout frame 32 on which it rests, provides an anti-rattle spring. The spring force acts upon both the step unit 16 and the slideout frame 32, pressing them down onto the lower portion of the mounting frame 44, to prevent rattling of the entire folding steps 10 during movement of the vehicle 12.

Various other means may be provided for limiting the rearward movement of the step unit in the mounting frame, such as a tab on the step unit positioned to catch a portion of the mounting frame. Likewise, additional positive locking means requiring manual release may be provided to retain the step unit in its stowed position for travel.

The steps 10 may be easily erected in one continuous movement by the operator pulling outwardly and then pushing downwardly on the lower step 20. This accomplishes first the horizontal sliding out of the slideout frame 32 and the step unit 16 and then the pivoting upright of the step unit 16. The step unit 16 then drops by its own weight into the locked position described hereinabove. The central pivot point provides easy balanced weight rotation of the step unit.

It may be seen that there has been described herein improved folding steps with many advantageous operating and manufacturing features. While the apparatus described herein is presently considered to be preferred, it is contemplated that further variations and modifications within the purview of those skilled in the art can be made herein. The following claims are intended to cover all such variations and modifications as fall within the true spirit and scope of the invention.

What is claimed is:

1. Retractable vehicular steps comprising:
a step unit having a spaced plurality of steps including at least an upper step and a lower step;
a step stowage unit for retractably stowing said step unit adapted to mount to a vehicle below an egress area of said vehicle;
extension means for horizontally extending and supporting said step unit from said stowage unit;
and pivotal interconnecting and locking means pivotably interconnecting said extension means with said step unit intermediately of said step unit between said upper and lower steps and supporting said step unit by said extension means when said step unit is extended from said stowage unit;
said step unit being pivotable about said pivotal interconnecting and locking means between a horizontal storage position and an upright operating position in which said upper step on said step unit is positioned substantially vertically above said stowage unit and adjacent said egress area of said vehicle, and said lower step on said step unit is positioned substantially below said stowage unit;
said step unit in said operating position being automatically locked against pivotal movement by said pivotal interconnecting and locking means;
said pivotal interconnecting and locking means comprising a slot with an elongate locking slot portion, and a spaced pair of pins simultaneously laterally closely confined within said locking slot portion when said step unit is in said operating position and forceably retained therein by the weight of, and step load upon, said step unit in said operating position;
and wherein at least one of said spaced pair of pins is slideably removable from said locking slot portion to provide said pivoting of said step unit to said horizontal stowage position.

2. The retractable vehicular steps of claim 1 wherein said step unit is an integral unit with a spaced pair of side members supporting said steps, wherein said pivotal interconnecting and locking means comprises said slot in each of said side members and said spaced pair of pins on said extension means engaged by said slot wherein said pins are slidable within said slot to allow pivoting of said step unit about said extension means from said operating position to a generally horizontal said stowage position, in which said step unit is retractable within said extension means into said step stowage unit.

3. The retractable vehicular steps of claim 2 wherein said locking slot portion of said slot has generally parallel, linear, vertically extending sides spaced apart substantially the diameter of said pins simultaneously closely confining both of said pins when said step unit is in said operating position.

4. The retractable vehicular steps of claim 1 wherein said slot has a boomerang shape with said locking slot portion extending linearly in a generally vertical direction parallel said step unit when said step unit is in said operating position.

5. The retractable vehicular steps of claim 1 wherein said locking slot portion is an upper portion of said slot and has generally vertically extending and linear and closely spaced parallel sides and terminates in a closed upper end, and wherein in said operating position said step unit is vertically supported by abutment of the uppermost one of said pair of pins with said closed upper end of said upper portion of said slot and said step unit is locked to said extension means by close confinement of both of said pins between said sides of said upper portion of said slot.

\* \* \* \* \*